(38.)
PATRICK HOWE
Improvement in Machines for Pressing Cloth.
No. 121,720. Patented Dec. 12, 1871.
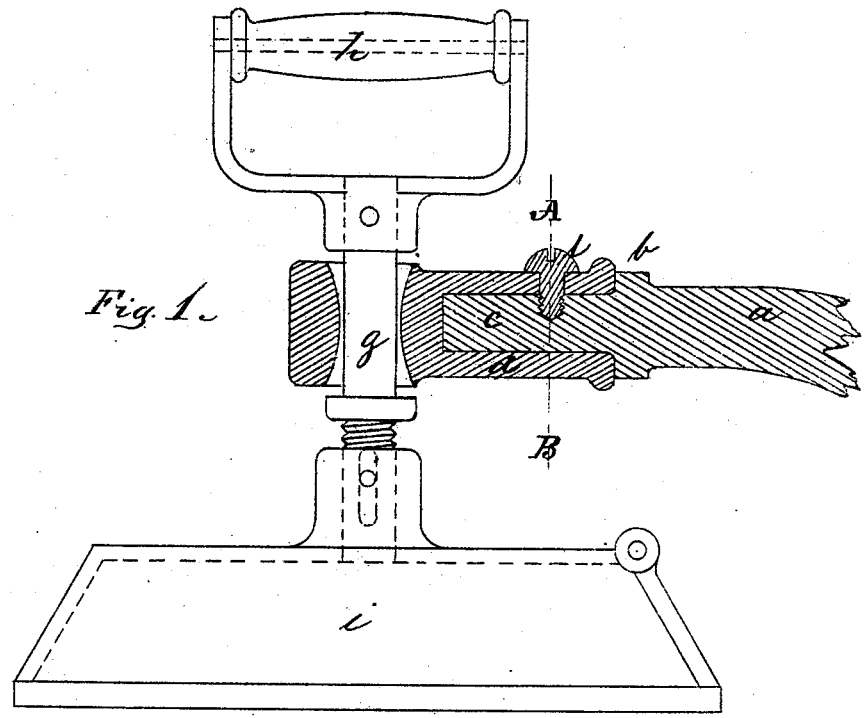
Fig. 1.
Fig. 2. Fig. 3.
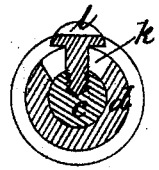
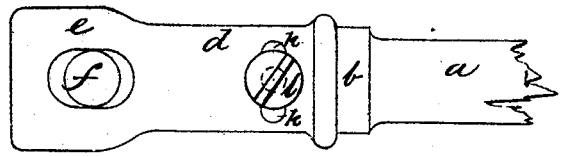
Witnesses:
Helen S. Andrew
James P. Gardner
Inventor:
Patrick Howe
by Alban Andrén, his atty.

UNITED STATES PATENT OFFICE.

PATRICK HOWE, OF BOSTON, MASSACHUSETTS.

IMPROVEMENT IN MACHINES FOR PRESSING CLOTH.

Specification forming part of Letters Patent No. 121,720, dated December 12, 1871.

*To all whom it may concern:*

Be it known that I, PATRICK HOWE, of Boston, in the county of Suffolk and State of Massachusetts, have invented certain new and useful Improvements in Machines for Pressing Cloth, of which the following is a specification:

The nature of my invention relates to a connection for pressing arms on cloth-pressing machines for the purpose of giving the goose on such a machine any proper inclination in any desired direction, as may be needed in pressing sundry manufactured clothing or other material, as will now be shown and described.

On the drawing, Figure 1 is a central longitudinal section of the invention, with the goose attached thereto. Fig. 2 is a cross-section over the line A B, taken on Fig. 1; and Fig. 3 is a ground plan.

Similar letters refer to similar parts wherever they occur in the drawing.

$a$ is the pressing-arm on a cloth-pressing machine, provided with a collar, $b$, as shown. The arm $a$ terminates as a cylindrical rod, $c$, as fully represented on Figs. 1 and 2. The end $c'$ projects into and fits in a bored out-sleeve, $d$, by which arrangement the sleeve $d$ is allowed to turn around the rod $c$. The sleeve $d$ terminates in a hub, $e$, provided with a hole, $f$, through which the goose-spindle $g$ projects, as shown. A handle, $h$, is attached firmly to the upper end of the spindle $g$ in the usual way, and the goose $i$ is attached to the lower end of the spindle $g$ in any suitable way. I wish, here, to say that I do not claim any particular goose, spindle, or handle, as these parts may be constructed so as to co-operate with my invention in any suitable way. The hub $e$ has a hole, $f$, through it; said hole $f$ is slotted in the upper and lower ends, as shown on Fig. 1, but made circular, or nearly so, in the middle, by which arrangement the goose is allowed to swing forward and backward in the direction of the pressing-arm $a$. The sleeve $d$ is provided on the upper side with a slot-hole, $k$, through which the screw $l$ projects. The said screw $l$ is screwed into the cylinder $c$, by which arrangement the sleeve $d$ is prevented from slipping off the arm $c'$ and at the same time allowed to swing freely around the said arm $c'$ as far as the slot-hole $k$ will permit. The length of the slot-hole $k$ may be made so as to let the goose $i$ swing one-third or one-half, more or less, of a revolution, as may be desired. The object of having the slot-hole $k$ on the upper side of the sleeve $d$ is so as not to weaken the under side of the sleeve, on which side the strain comes when the pressing-machine is operated.

From this will readily be understood that the goose $i$ may be swung in any desired position by the arrangement of the sleeve $d$, arm $c$, and slot-hole $f$, with great ease and convenience.

I am aware that a patent was granted to L. B. Storrs, of Canton, New York, dated June 8, 1858, and numbered 20,519; but I do not use a fork and ball-joint, as he does; neither do I project the end of such a fork in the pressing-arm, because such a construction is too costly, and at same time very weak and liable to get out of order; whereas my invention is easily made, strong, and quickly operated.

Having thus described the nature, construction, and operation of my invention, I wish to secure by Letters Patent, and claim—

In combination with the goose $i$, spindle $g$, and the pressing-arm $a$, the cylindrical end $c$, sleeve $d$ provided with the slot-hole $k$, and hub $e$ with its hole $f$, as and for the purpose set forth.

PATRICK HOWE.

Witnesses:
ALBAN ANDRÉN,
MYRON A. POOLE.

(38)